United States Patent

[11] 3,582,696

| [72] | Inventor | George M. Rosenberry, Jr.<br>Elnora, N.Y. |
|---|---|---|
| [21] | Appl. No. | 504 |
| [22] | Filed | Jan. 5, 1970 |
| [45] | Patented | June 1, 1971 |
| [73] | Assignee | General Electric Company<br>Continuation of application Ser. No.<br>717,603, Apr. 1, 1968, now abandoned. |

[54] DYNAMOELECTRIC MACHINE WITH A SOLID IRON ROTOR
1 Claim, 2 Drawing Figs.

[52] U.S. Cl. .................................................. 310/61,
310/64, 310/262
[51] Int. Cl. .................................................. H02k 1/32

[50] Field of Search .................................. 310/54, 58,
59—65, 211, 216, 218, 261, 262, 254

[56] References Cited
UNITED STATES PATENTS

| 1,920,309 | 8/1933 | Hoseason ........................ | 310/62X |
| 2,692,956 | 10/1954 | Kaczor et al. .................. | 310/59X |
| 2,497,113 | 2/1950 | Curry ............................. | 310/211X |

Primary Examiner—Milton O. Hirshfield
Assistant Examiner—B. A. Reynolds
Attorneys—James T. Comfort, James C. Davis, Jr., Frank L. Neuhauser, Oscar B. Waddell and Melvin M. Goldenberg ABSTRACT: A dynamoelectric machine has a stator and a rotor. The rotor is solid cast iron. A plurality of holes are formed in the rotor in four peripheral regions to divide the rotor into a plurality of peripheral flux paths. The heat in the rotor is dissipated by drawing high-velocity air through the holes by a fan.

INVENTOR.
GEORGE M. ROSENBERRY, JR.
BY
J. T. Comfort
HIS ATTORNEY

DYNAMOELECTRIC MACHINE WITH A SOLID IRON ROTOR

This application is a continuation of application Ser. No. 717,603, filed Apr. 1, 1968, now abandoned.

It is therefore an object of this invention to provide a new and improved dynamoelectric machine having a solid iron rotor.

Another object of this invention is to provide a new and improved dynamoelectric machine with a solid iron rotor where unusually large amounts of heat generated in the rotor may be successfully dissipated.

The rotors in some dynamoelectric machines are of solid iron. Solid iron rotors are more rugged and withstand higher temperatures. However, it is difficult to dissipate unusually large amounts of heat generated in the solid iron rotors in some applications such as variable-speed motors under constant frequency operation. Unusual duty cycles also generate large amounts of heat.

Figure 1:
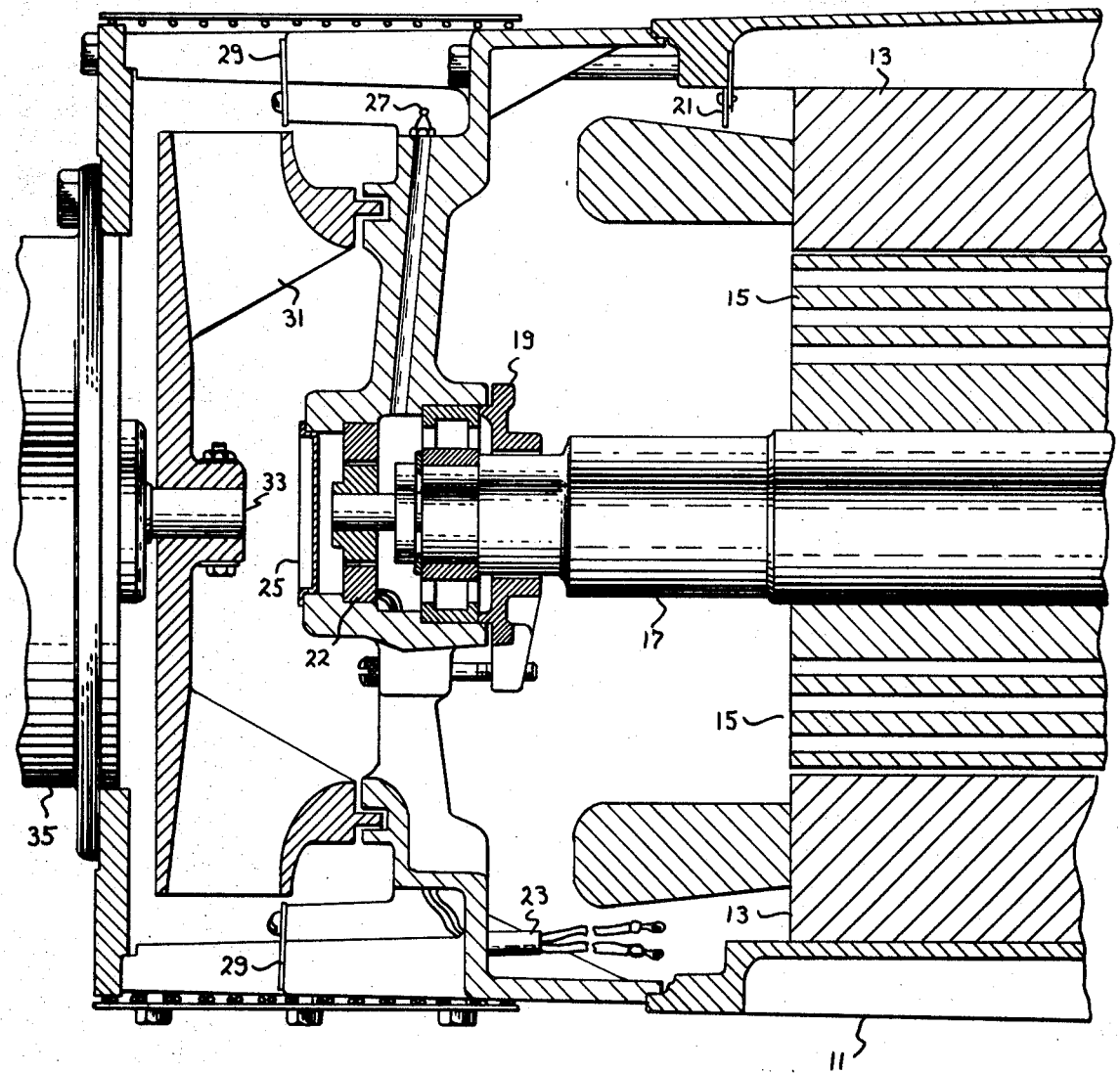
Figure 2:
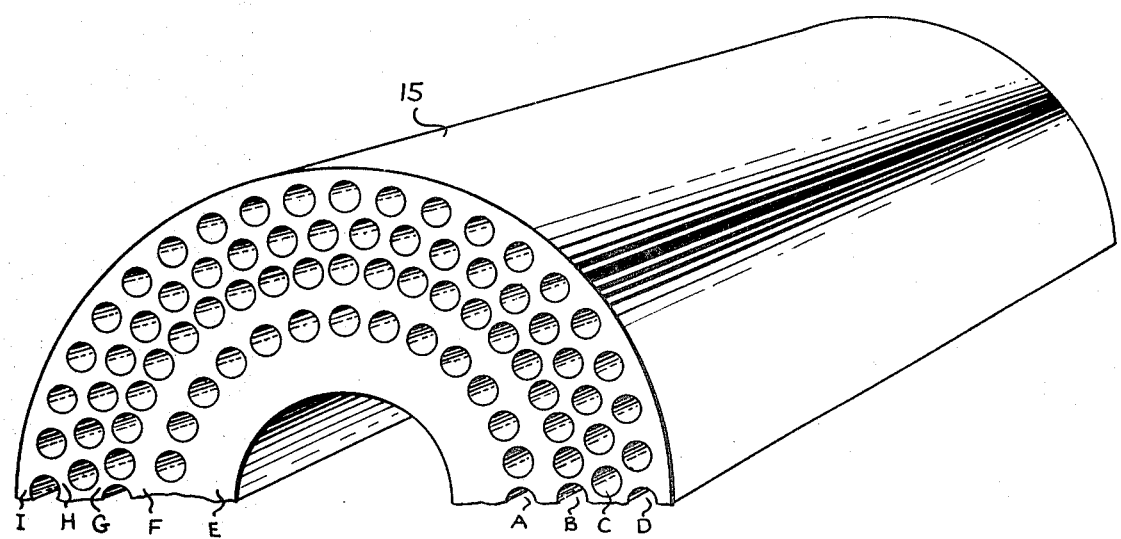

While the specification concludes with claims particularly pointing out and distinctly claiming the subject matter which I regard as my invention, it is believed the invention will be better understood from the following description taken in connection with the accompanying drawings in which:

FIG. 1 is a partial cross section of a motor constructed according to the teachings of this invention; and FIG. 2 shows the solid iron rotor used in the motor shown in FIG. 1.

Referring now to FIG. 1 for a description of a motor constructed according to this invention, a motor housing 11 encloses a stator 13. A rotor 15 mounted on a shaft 17 is rotatably mounted in the stator 11. The rotor is made of a suitable magnetizable material such as iron or steel. The shaft is likewise of conventional material used for this purpose, preferably steel which is of a fairly high magnetizable character. The rotor 15 has a plurality of holes therein. The specific construction and significance of these holes in the rotor 15 will be described later. The shaft 17 is rotatably mounted in a bearing 19. A tachometer 21 with tachometer leads 23 is shown mounted in the motor. A dust cap 25 keeps dust from the bearing 19. A lubricating fitting 27 is provided for lubricating the bearing 19. Air deflectors 21 and 29 are provided so that air from a fan 31 is deflected to the rotor 15. The fan 31 is secured to a motor shaft 33 from a separate fan motor 35.

It should be noted that only one end of the motor constructed according to this invention is shown in FIG. 1. The other end is constructed in a conventional manner similar to that for the end shown in the drawing.

The rotor itself is shown in more detail in FIG. 2. A large number of axially extending circular holes are formed in the rotor 15. The specific rotor shown in FIGS. 1 and 2 was cast from an iron alloy with 152 longitudinal holes cast therein. Each hole has a ½-inch diameter and extends through the rotor for its whole 8¼-inch length. The rotor 15 has an 11 5/16-inch diameter. Four rows of holes A—D are cast in the rotor 15. The inner row A has 32 holes with their centers on a 3 11/32-inch radius cast equidistant about the rotor. The second row B has 40 holes on a 4 1/16-inch radius, the third row C has 40 holes on a 4 21/32-inch radius, and the fourth row D has 40 holes on a 5¼-inch radius. The holes in the third row C are offset from the holes in the second and fourth rows A and D so that they can be formed close together.

The holes may be placed in a rotor by other methods. For instance, they might be drilled in a solid rotor. In a rotor so constructed, 336 holes five-sixteenths inch in diameter were drilled in a solid rotor having an 11.320-inch diameter. Six rows of holes were drilled in the rotor with 60 holes in the four outside rows and 48 holes in the two inner rows.

The plurality of rows of holes in the rotor 15 divides the rotor into five regions E—I. Each region is in the order of one-half inch or less thick. Thus, no region, or the summation of regions, is sufficient to carry the whole flux in the rotor until the last region E is reached. Each region E—I carries a portion of the flux. By providing a plurality of regions in the rotor 15 as disclosed, the flux must penetrate down into the inner regions of the rotor. At each region part of the flux bleeds off so that the heat loss is distributed throughout the rotor 15.

The rotor 15 shown in FIG. 2 was installed in a motor as shown in FIG. 1. The fan-driven motor 35 was started to rotate the fan blade 31. After power is applied to the stator 13, the rotor 15 rotates. The resulting flux in the rotor 15 penetrates into the rotor 15 throughout the holes.

High-velocity air is sucked through the holes in the rotor 15 by the fan blade 31. The high-velocity air cools the rotor in this manner. The heat generation takes place throughout the hole region so that the heat does not have to be conducted over substantial distance through the iron. Thus, there is not a high-temperature drop in the rotor. Excellent heat dissipation results using this invention.

I claim:

1. An induction motor rotor consisting essentially of: a cylindrical solid iron rotor body having a plurality of radially spaced rows of axial holes therethrough, the holes in adjacent rows being circumferentially offset to permit forming the rows close together, said rows of holes defining in said rotor body a plurality of radially spaced flux-carrying regions contiguous with said rows, each of said regions being required to carry a portion of the normal total rotor flux for causing the rotor flux to penetrate down into the inner regions of the rotor whereby generation of heat loss is distributed throughout said rotor body; and means for rotatably supporting said rotor body.